(12) United States Patent
Leach

(10) Patent No.: US 8,272,479 B1
(45) Date of Patent: Sep. 25, 2012

(54) HUNTING TREE STAND

(76) Inventor: Daniel Lee Leach, Johnson City, TN (US)

( * ) Notice: Subject to any disclaimer, the term of this patent is extended or adjusted under 35 U.S.C. 154(b) by 165 days.

(21) Appl. No.: 12/853,004

(22) Filed: Aug. 9, 2010

(51) Int. Cl.
*E04G 3/00* (2006.01)

(52) U.S. Cl. .......... 182/187; 182/128; 182/131; 182/152

(58) Field of Classification Search ................ 182/128, 182/130–132, 152, 187, 188; 248/218.4
See application file for complete search history.

(56) References Cited

U.S. PATENT DOCUMENTS

| | | | |
|---|---|---|---|
| 1,197,999 A | 9/1916 | Beckett | |
| 1,231,823 A * | 7/1917 | Weasler | 182/128 |
| 2,879,830 A | 3/1959 | Johnson | |
| 3,003,646 A | 10/1961 | Wolf | |
| 3,030,160 A | 4/1962 | Tandy | |
| 3,994,365 A * | 11/1976 | Petermann et al. | 182/2.1 |
| 4,056,902 A | 11/1977 | Ziegler, Jr. | |
| 4,730,699 A | 3/1988 | Threlkeld | |
| 4,730,700 A | 3/1988 | Miller et al. | |
| 5,090,506 A | 2/1992 | Womack et al. | |
| 5,131,496 A | 7/1992 | White | |
| 5,339,922 A | 8/1994 | Beechler | |
| 5,348,119 A | 9/1994 | Filkins | |
| 5,363,941 A | 11/1994 | Richard | |
| 5,515,943 A | 5/1996 | Antonelli | |
| 5,522,186 A | 6/1996 | Jarman | |
| 5,538,101 A * | 7/1996 | Kempf | 182/116 |
| 5,562,180 A | 10/1996 | Herzog et al. | |
| 5,853,066 A * | 12/1998 | Gohn | 182/20 |
| 6,668,977 B2 * | 12/2003 | Arsenault | 182/187 |
| 6,725,972 B1 * | 4/2004 | Krier et al. | 182/187 |
| 2003/0209388 A1 | 11/2003 | Arsenault et al. | |
| 2009/0277721 A1 * | 11/2009 | Weir | 182/115 |

* cited by examiner

*Primary Examiner* — Darnell Jayne
*Assistant Examiner* — Kristine Florio
(74) *Attorney, Agent, or Firm* — Luedeka Neely Group, PC

(57) ABSTRACT

A tree stand having one or two C-shaped platform sections removably and supportably positionable on one or two mounting brackets, with each platform section being foldable in half for ease of transport and storage, and including a hinged portion for enabling access to the stand from below.

5 Claims, 7 Drawing Sheets

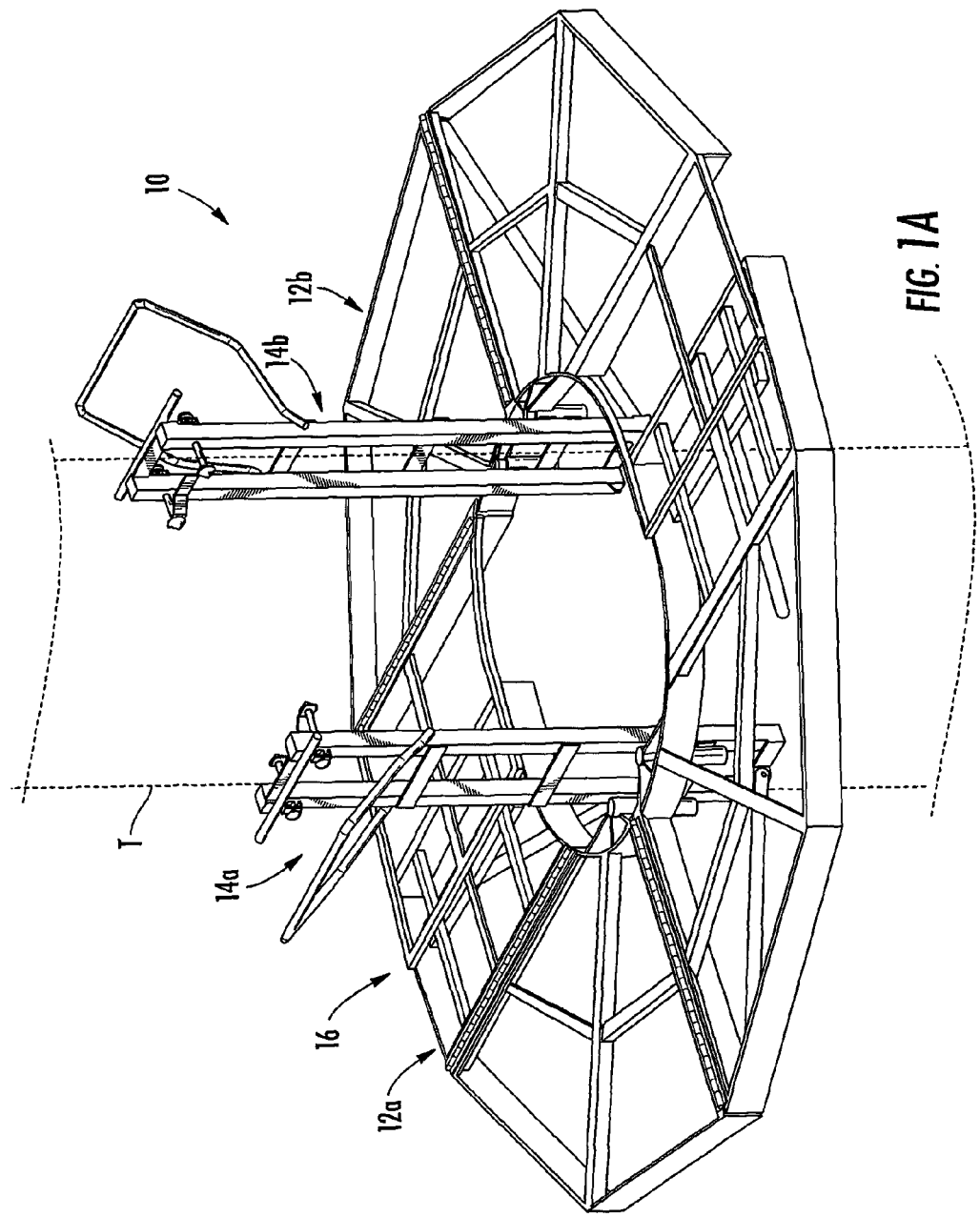

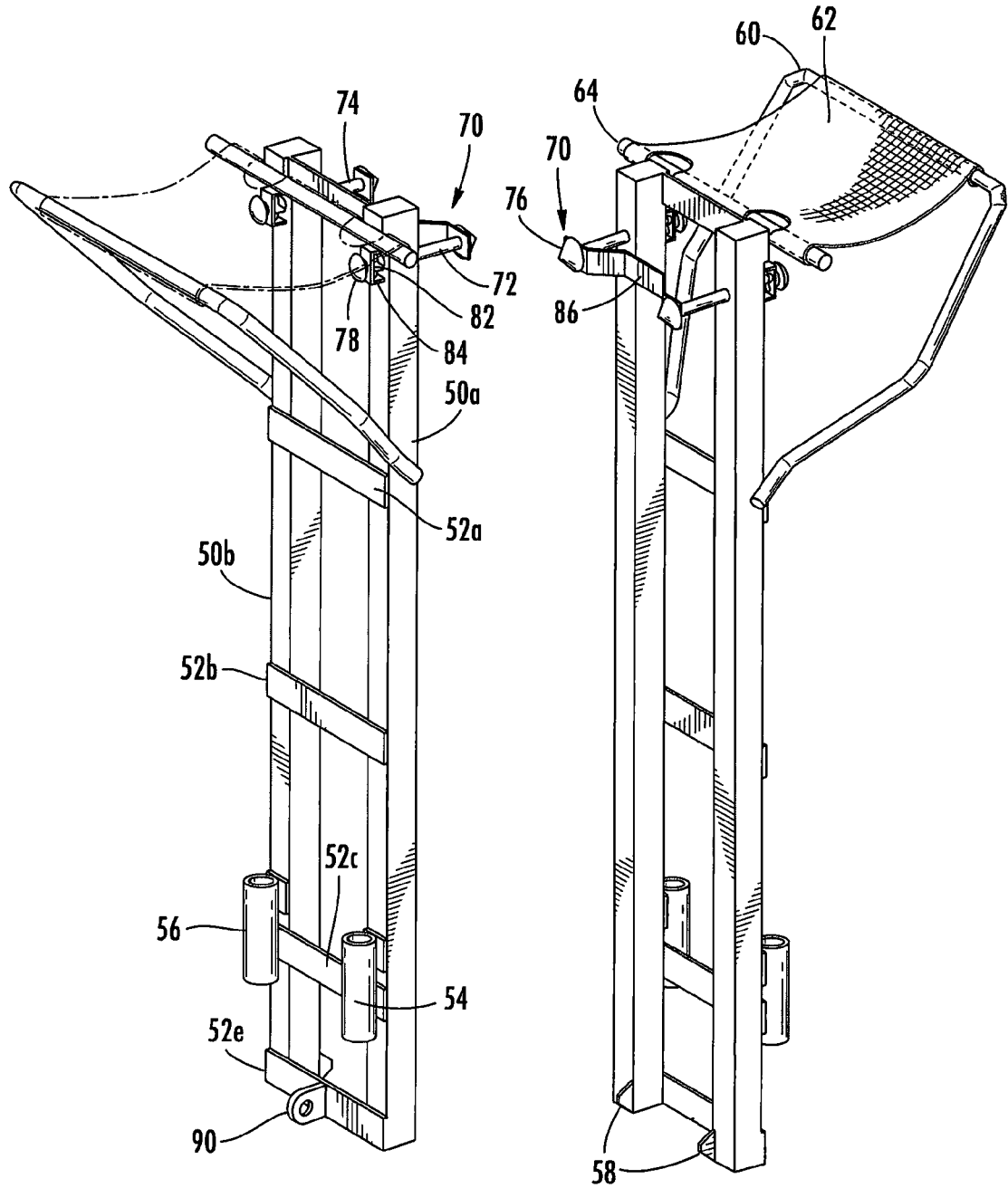

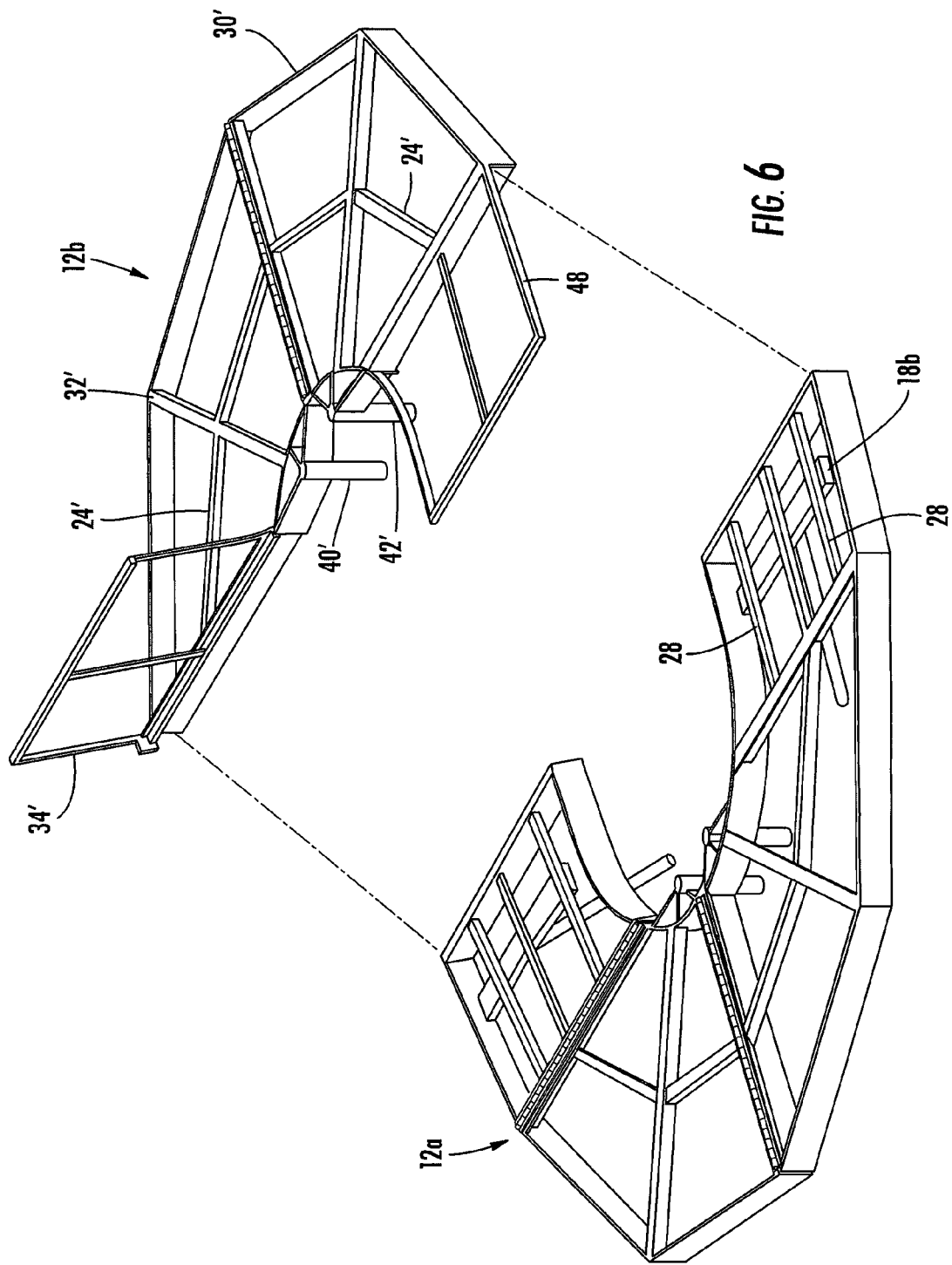

HUNTING TREE STAND

FIELD

This disclosure relates to the field of tree stands for hunting. More particularly, this disclosure relates to a tree stand having features which give the stand a greater platform area, make the stand flexible in its adaptation to a tree including having the option of mounting the stand in a 180 or a 360 degree configuration, portable, and easily removed or installed.

BACKGROUND

Tree stands enable a hunter to position themselves above the ground as to not make them prone to detection by animals during hunting or observation. Various models of tree stands exist in the prior art that serve various goals. Some models are designed to be permanently attached to the same tree for extended periods of time. Others allow the hunter to climb with the stand and therefore reposition the stand during each hunt.

Most traditional tree stands limit the user to one stationary position, thus limiting their view to one side of the tree. While some of these traditional designs have been portable and easy to set up, they fall short in the amount of standing area that they provide. Some tree stands which encircle a tree have been proposed, however these designs are typically less portable, more difficult to install, and difficult to climb into. These circular tree stands require support from the ground, or require an opening in the floor in order for the hunter to enter into the tree stand. Additionally, the encircling tree stands are only capable as functioning in one configuration without the ability of being mounted in another configuration. Accordingly, there is a need for a tree encircling stand that allows for portability, easy installation and removal from the tree, allows for installation of half the 360 degree platform independently, and has the ability to be adjustably configured to fit various tree sizes.

The present disclosure advantageously provides tree stands for hunting that have a greater platform area, have the ability to be installed in a 180 degree independent configuration, are portable, and are easily removed and installed.

SUMMARY

The above and other needs are met by a hunting tree stand mountable to a tree. In one embodiment, the stand includes a first mounting bracket removably securable to the tree; and a first generally C-shaped platform section removably and supportably positionable on the first mounting bracket The first platform section includes a fixed position portion and first and second adjacent portions, an edge of the first adjacent portion being hingedly positioned adjacent an edge of the fixed position portion by a first hinge, and an edge of the second adjacent portion being hingedly positioned adjacent an edge of the first adjacent portion by a second hinge opposite the fixed position portion.

The first hinge permits the first platform section to be folded substantially in half for ease of storage and transportation. The second hinge permits the second adjacent portion to be folded upwardly relative to the first adjacent portion to enable a user climbing up the tree to gain access to the platform section from below the platform section.

A second mounting bracket and C-shaped platform section may be paired with the first platform section and mounting bracket to provide an encircling platform that encircles the tree. The structure of the platform sections also enables installation on a variety of tree sizes to provide partial or full encircling platforms.

Thus, tree stand system according to the disclosure advantageously provides a portable and compact system that enables configuration of either a 360 degree platform or an independent 180 degree semi-platform removably mounted to a tree.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIGS. 1a and 1b are perspective views of the tree stand according to the disclosure having a 360 degree platform and a bracket mounting system for attachment to a tree.

FIG. 4 and FIG. 5 are a close-up front and back views of a bracket mounting assembly.

FIG. 6 is an exploded view of two independent platform sections.

DETAILED DESCRIPTION

Figure 1B:
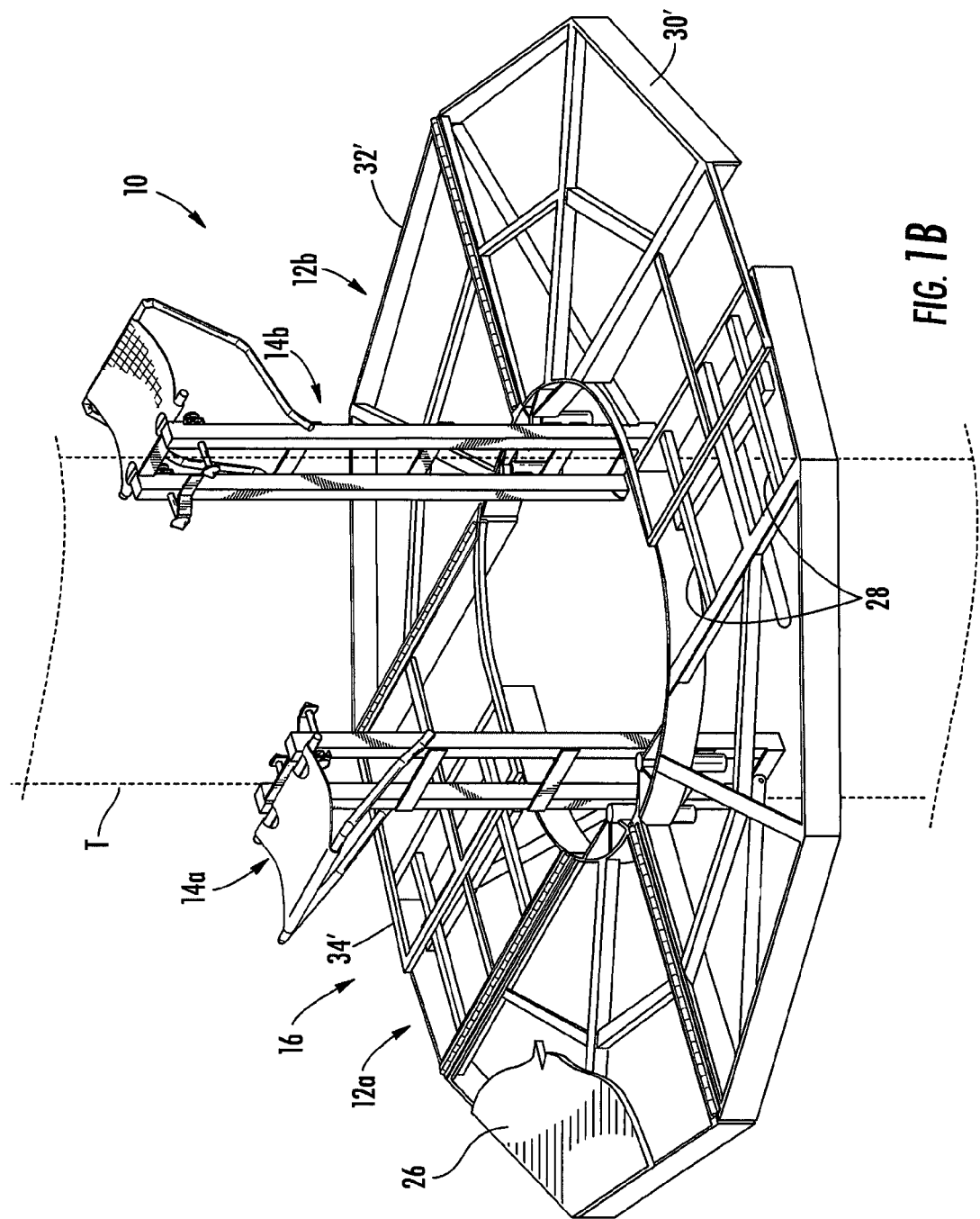

With reference to the drawings, the disclosure relates to a tree stand 10 configured as having platform sections 12a and 12b suspended from a tree T, or other generally cylindrical structure, such as a pole, by mounting brackets 14a and 14b, respectively. The platform sections 12a and 12b cooperate to provide a platform 16 that fully encircles the tree T. Additional supports 18a and 18b may be utilized with the platform section 12a.

Figure 2:
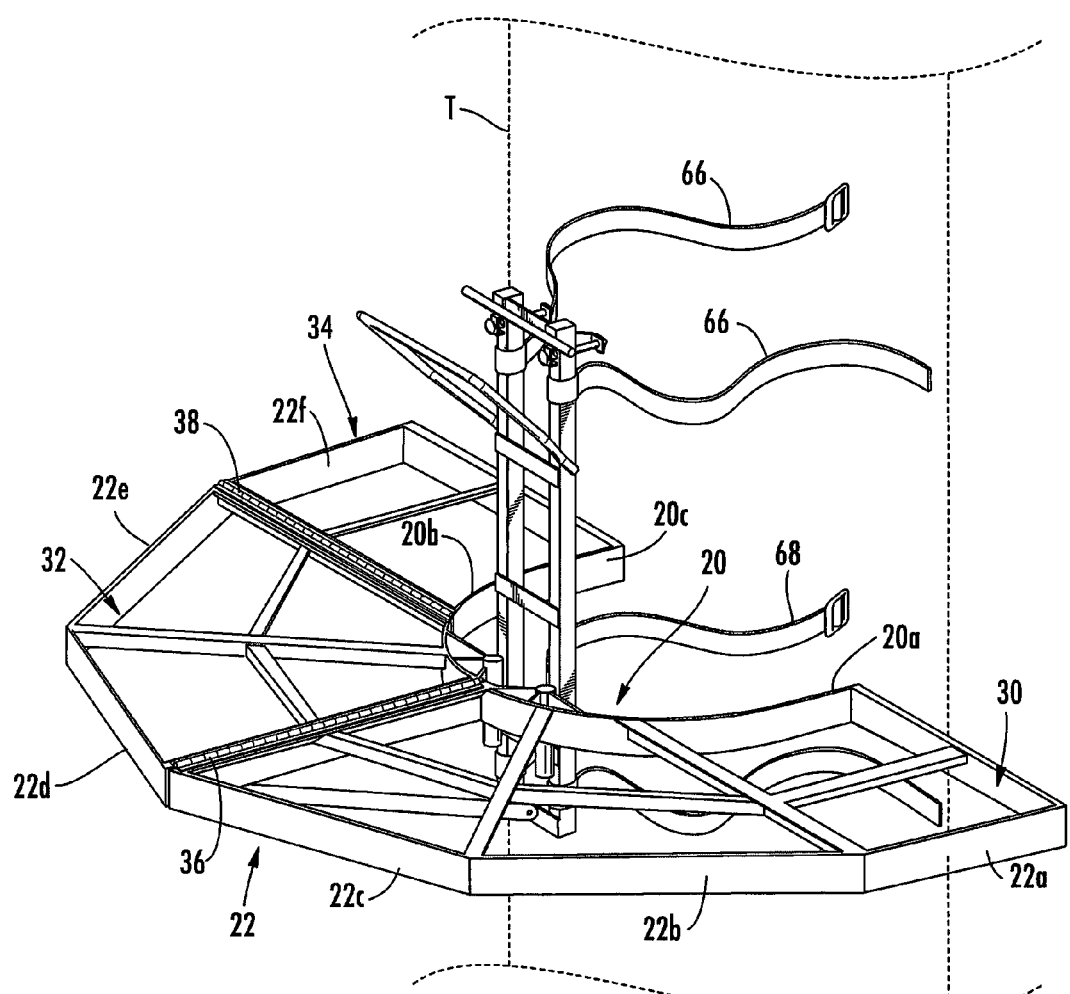
FIG. 2 illustrates the stand of FIG. 1a reconfigured by removal of some of the components to provide an independent 180 degree platform area.
Figure 3:
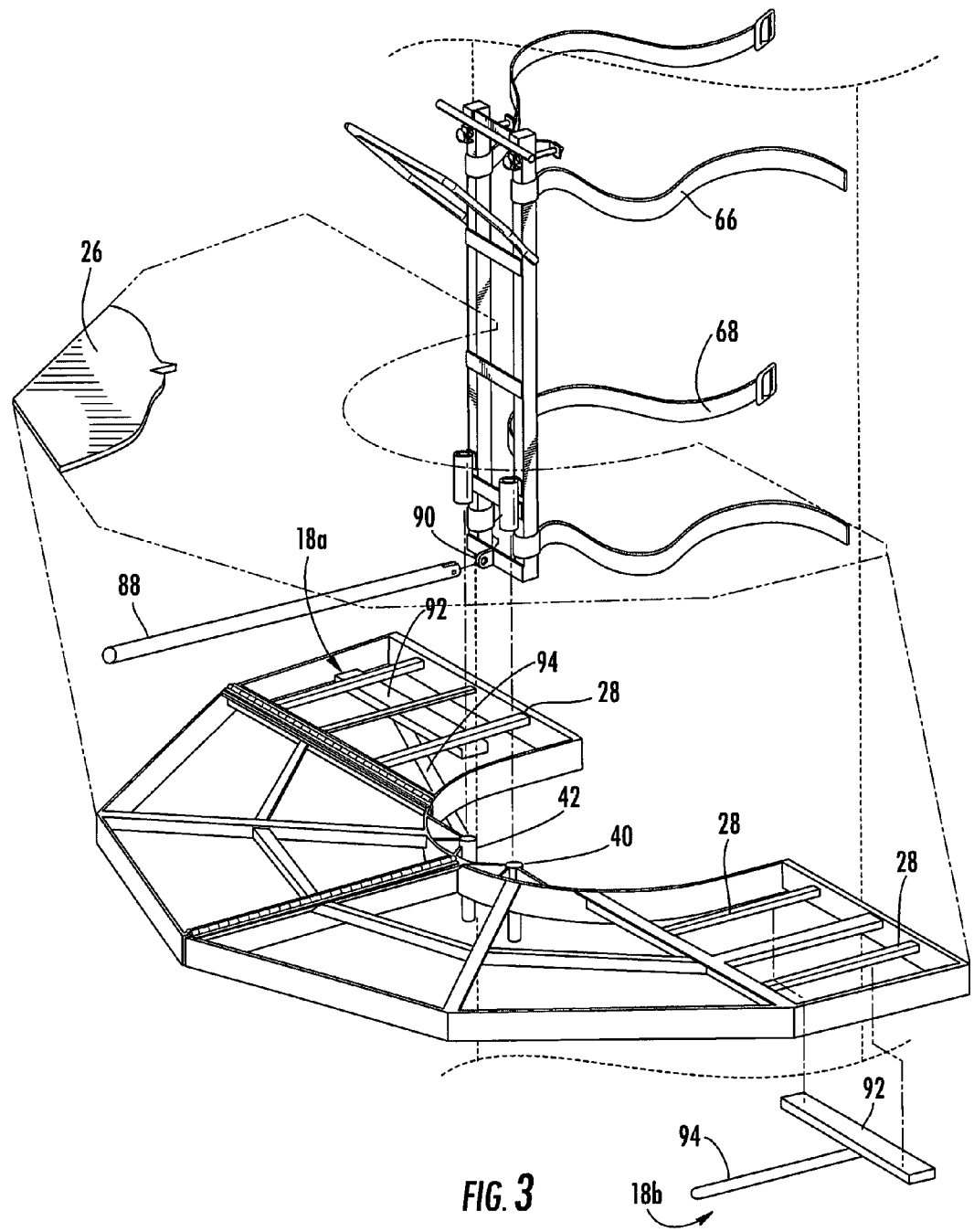
FIG. 3 is an exploded view of the configuration of FIG. 2.

With reference to FIGS. 2 and 3, the platform section 14a may be installed alone on the tree T using the mounting bracket 12a to provide a tree stand structure that partially encircles the tree T, preferably providing about 180 degrees of encirclement of the tree T.

With continued reference to FIG. 2, the platform section 14a is generally C-shaped and includes a generally U-shaped inner peripheral sidewall 20 provided by discrete sidewall sections 20a, 20b, and 20c, and an outer peripheral sidewall 22 having angled faces 22a-22f. A plurality of frame members 24 extend between portions of the sidewalls 20 and 22, such that the sidewalls 20 and 22 and the frame members 24 provide a strong and rigid frame structure. In this regard, a floor 26 is connected to and supported by the frame members 24 so that a suitable floor is provided over the frame members 24 such that a user may walk across and be supported by the platform section 14a. Members 28 may be located and secured adjacent a lower portion of the free ends of the section 14a for receiving the additional supports 18a and 18b.

The platform section 14a may be made of lightweight but sufficiently strong aluminum sheet materials, with the floor 26 made of aluminum grating. Other materials, such as wood and composites may be used, the use of a high strength to weight material being preferred for ease of portability.

Figure 7:
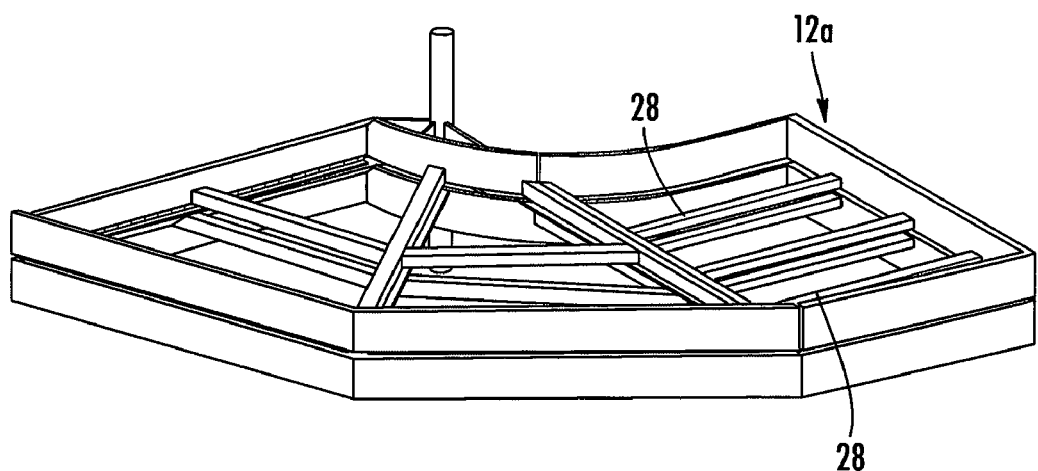
FIG. 7 shows folding of a platform section for ease of storage and transport.

The platform section 14a includes a fixed position portion 30 that represents a portion, such as about half, of the platform section 14a, and a pair of adjacent portions 32 and 34 that represent the other half of the platform section 14a. The floor 26 for each of the portions 30-34 will be provided by discrete floor sections, one for each of the portions 30-34. An edge of the portion 32 is hingedly positioned adjacent an edge of the portion 30 by a hinge 36. An edge of the portion 34 is hingedly positioned adjacent an edge of the portion 32 (opposite the portion 30) by a hinge 38. The hinge 36 permits the platform section 14a to be folded in half for ease of storage and transportation, with the floor 26 of the portions 32 and 34 overlying and facing the floor 26 of the portion 30 as shown in FIG. 7. The hinge 38 permits the portion 34 to be folded upwardly relative to the portion 32 as seen in FIG. 6 to enable a user climbing up the tree to gain access to the platform section 14a. Mounting pins 40 and 42 are provided on the sidewall sections 20a and 20b, adjacent the portions 30 and 32 of the frame section 14a. The mounting pins 40 and 42 permit the platform section 14a to be removably mounted onto the mounting bracket 12a.

The platform section 14b is a mirror-image of and substantially identical to the platform section 14a and is identified with the same reference numbers in primes, except portions of sections 30' and 34' of the section 14b are configured to overlap the sections 30 and 34 of the section 14a. This overlap allows for the platform sections 14a and 14b to be adjustably positioned and enable the tree stand 10 to adjustably fit trees of various diameters. Thus, section 34' is of reduced thickness to fit over the section 34, and the section 30' has a reduced thickness end portion 48 configured to fit over the free end of the section 30.

With reference to FIGS. 4 and 5, front and rear perspective views of the mounting bracket 14a are provided. The mounting bracket 14b is identical to the mounting bracket 14a. The mounting bracket 14a (and mounting bracket 14b) includes a pair of vertical support bars 50a and 50b. The vertical support bars 50a and 50b are secured to each other through multiple support crossbars 52a, 52b, 52c, 52d, and 52e. Attached to the lower portion of vertical support bars 50a and 50b are the mounting pockets 54 and 56 which are configured to mountably receive the pins 40 and 42 of the platform section 12a. Tree engagement points 58 are located at lower portions of the support bars 50a and 50b on the back side of the support bars 50a and 50b for engaging the tree T to inhibit lateral movement of the mounting bracket 14a when installed on the tree T.

A seat bar 60 is hingedly attached to the vertical support bars 50a and 50b and configured such that it may be raised to a storage position and lowered to a seated position. When the seat bar 60 is in the raised position it, it is oriented such that the bar 60 is parallel to the vertical support bars 50a and 50b thereby increasing the amount of space available for standing on the tree stand 10. When the seat bar 60 is in the lowered or seated position, it is oriented such that the bar is at an approximately 45 degree angle to the vertical support bars 50a and 50b allowing the hunter to rest on the seat with their back against the tree T. The seat bar 60 is configured such that a seating fabric 62 is attached on one end to the seat bar 60 and on the other end to a bar 64 located at the top portion of the vertical support bars 50a and 50b on the mounting bracket 14a. The seating fabric 62 provides a seat for the hunter while occupying the tree stand.

Returning to FIG. 2, the mounting bracket 14a is preferably attached to the tree T by using buckle straps 66 and 68 removably attached to the vertical support bars 50a and 50b of the mounting bracket 14a. The straps 66 and 68 preferably encircle the circumference of the tree T before attaching to a second point on the vertical support bars 50a and 50b. The straps 66 and 68 may attach the mounting bracket 14a independently to the tree T or may be configured to attach both the mounting brackets 14a and 14b. That is, if the mounting bracket 14b is also installed, it may have its own straps in the same manner, or a pair of the straps may be used to attach both of the mounting brackets 14a and 14b. It is understood that a cable or like material may be used in place of a strap for securing the mounting brackets 14a and 14b to the tree T.

The mounting bracket 14a also includes a leveling system 70 to maintain the platform section 12a in a substantially level or other desired position. The leveling system 70 includes a pair of threaded bolts 72 and 74 associated with the support bars 50a and 50b, respectively. The bolt 72 includes a tree contact end 76 having a broad base and sharpened end and an opposite head 78. The bolt 72 passes through aligned smooth apertures 80 of support bar 50a and the extension of the tree contact end 76 relative to the support bar 50a, and hence toward or away from the tree T, is controlled by an adjustment knob 82 rotatably mounted within a bracket 84 on the support bar 50a. The knob 82 includes a threaded bore through which the bolt 72 is threaded and a knurled exterior such that a user may turn the knob 82 and cause the bolt 72 to rotate, moving the tree contact end 76 toward or away from the tree T. The bolt 74 is similarly mounted and movable relative to the support bar 50b. A tree engaging member 86 connects between the tree contact end 76 of the bolt 72 and a corresponding tree contact end of the bolt 74. The tree engaging member 86 may be a narrow length of a flexible aluminum or plastic strip and contoured to a generally wide U-shaped orientation to engage and conform to the tree T.

A brace 88 is hingedly connected to an outward facing brace tab 90 located on the lowermost crossbar 52e of the mounting bracket 14a. The brace 88 may be an elongate rod having a longitudinal slot cut into one end sized to fit over the brace tab 90. The brace tab 90 may include a central aperture and the longitudinal slot of the brace 88 may have aligned corresponding apertures such that when the brace 88 is located on the tab 90, a pin or the like may be inserted through the apertures to hingedly mount the end of the brace 88 to the tab 90. The brace 88 is of a length so as to engage the bottom of the platform section 14a and help brace the platform section 14a in a substantially level orientation. The end of the brace 88 that engages the bottom of the platform section 14a may also be configured to engage a pre-formed receiver on the platform section 14a if desired, such as a receiver such as the tab 90 and held in place as by a pin.

In addition to the brace 88, additional bracing may be provided by use of the supports 18a and 18b which mount to the members 28 of the platform section 14a. In this regard, the supports 18a and 18b include a mounting member 92 and a brace 94 secured thereto. The mounting member 92 may be adjustably secured to the members 28 of the platform section 14a as by fasteners. The brace 94 is an elongate rod that is fixedly mounted to the mounting member, as by welding, and extends at an angle of about 45 degrees to engage the tree T.

To adjust the level of the platform section 12a installed on the tree T with the mounting bracket 14a, the adjustment knob 82 is rotated either clockwise or counter-clockwise, which causes the tree contact end 76 of the bolt 72 to either thread toward or away from the tree T, changing the length of bolt 72 that extends beyond the vertical support bar 50a to either increase or decrease. When this length is increased, the top portion of the mounting bracket 14a moves further from the tree T while the lower portion of the bracket 14a, anchored by the engagement points 58 remains stationary. The increased distance between the top portion of the mounting bracket 14a and the tree T causes the platform section 12a to tilt in either direction, the platform section 12a remaining substantially perpendicular to the vertical support bar 50*a*. When the length of the bolt 72 extending beyond the vertical support bar 50*a* is decreased, the top portion of the vertical support bar 50*a* moves closer to the tree T relative to the lower portion of the vertical support bar 50*a*, causing the platform section 12*a* to tilt in the opposite direction. The use of two separate platform sections 12*a* and 12*b*, and the use of the two mounting brackets 14*a* and 14*b*, along with the overlap of the platform sections 12*a* and 12*b* advantageously enables the level of the platform sections 12*a* and 12*b* to be independently adjustable.

Accordingly, it will be appreciated that the tree stand system 10 enables a portable and compact system that enables configuration of either a 360 degree platform or an independent 180 degree semi-platform removably mounted to a tree. The system is also advantageously configured to allow for the platforms to be adjusted to a substantially level position.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A hunting tree stand mountable to a tree, comprising:
    a first mounting bracket removably securable to the tree; and
    a first generally C-shaped platform section removably and supportably positionable on the first mounting bracket, the first platform section including a fixed position portion and first and second adjacent portions, an edge of the first adjacent portion being hingedly positioned adjacent an edge of the fixed position portion by a first hinge, and an edge of the second adjacent portion being hingedly positioned adjacent an edge of the first adjacent portion by a second hinge opposite the fixed position portion,
    wherein the first hinge permits the first platform section to be folded substantially in half for ease of storage and transportation, and
    wherein the second hinge emits the second adjacent portion to be folded relative to the first adjacent portion to enable a user climbing up the tree to gain access to the platform section from below the platform section,
    wherein the hunting tree stand further comprises a second mounting bracket removably securable to a tree; and
    a second generally C-shaped platform section removably and supportably positionable on the second mounting bracket, wherein the second mounting bracket is mounted onto the tree opposite the first mounting bracket and the second platform section is positioned opposite the first mounting bracket such that the first and second platform sections encircle the tree to provide an encircling platform, with the second platform section including a fixed position portion and first and second adjacent portions, an edge of the first adjacent portion of the second platform section being hingedly positioned adjacent an edge of the fixed position portion of the second platform section by a third hinge, and an edge of the second adjacent portion of the second platform section being hingedly positioned adjacent an edge of the first adjacent portion of the second platform section by a fourth hinge opposite the fixed position portion of the second platform section,
    wherein the second adjacent portion of the second platform section overlies the second adjacent portion of the first platform section, and
    wherein the fourth hinge permits the second adjacent portion of the second platform section to be folded upwardly relative to the first adjacent portion of the second platform section, such that a user gains access to the encircling platform from below the encircling platform by folding the second adjacent portion of the first platform section and the section adjacent section of the second platform section.

2. The tree stand of claim 1, wherein the third hinge permits the second platform section to be folded substantially in half for ease of storage and transportation.

3. The tree stand of claim 1, wherein the first mounting bracket includes a pair of vertical support bars and leveling system, the leveling system comprising:
    a threaded bolt associated with each of the support bars, each threaded bolt positioned to pass through aligned smooth apertures defined on the support bar, and a rotatable adjuster associated with the bracket and configured to engage the threads of the bolt such that rotation of the adjuster rotates a distal end of the bolt toward or away from the tree to enable adjustable positioning of a portion of the mounting bracket relative to the tree to enable adjustment of the orientation of the platform section for enabling leveling of the platform section.

4. The tree stand of claim 3, wherein the second mounting bracket includes a pair of vertical support bars and leveling system, the leveling system comprising:
    a threaded bolt associated with each of the support bars, each threaded bolt positioned to pass through aligned smooth apertures defined on the support bar, and a rotatable adjuster associated with the bracket and configured to engage the threads of the bolt such that rotation of the adjuster rotates a distal end of the bolt toward or away from the tree to enable adjustable positioning of a portion of the mounting bracket relative to the tree to enable adjustment of the orientation of the platform section for enabling leveling of the platform section.

5. The tree stand of claim 1, further comprising a brace mountable to the mounting bracket and extending to engage a portion of the platform section.

* * * * *